United States Patent [19]
Bonham

[11] Patent Number: 6,065,045
[45] Date of Patent: May 16, 2000

[54] METHOD AND APPARATUS FOR OBJECT REFERENCE PROCESSING

[75] Inventor: Peter Bonham, Friedrichsdorf, Germany

[73] Assignee: Tandem Computers Incorporated, Cupertino, Calif.

[21] Appl. No.: 08/887,987

[22] Filed: Jul. 3, 1997

[51] Int. Cl.[7] .................................................. G06F 13/00
[52] U.S. Cl. ........................ 709/213; 709/214; 709/215
[58] Field of Search ................................... 709/213, 214, 709/215

[56] References Cited

U.S. PATENT DOCUMENTS

| | | | |
|---|---|---|---|
| 4,754,394 | 6/1988 | Brantley, Jr. et al. | 711/5 |
| 5,307,490 | 4/1994 | Davidson et al. | 395/650 |
| 5,339,422 | 8/1994 | Brender et al. | 395/700 |
| 5,485,579 | 1/1996 | Hitz et al. | 395/200.12 |
| 5,537,417 | 7/1996 | Sharma et al. | 370/94.1 |
| 5,577,251 | 11/1996 | Hamilton et al. | 395/671 |
| 5,682,534 | 10/1997 | Kapoor et al. | 395/684 |
| 5,771,383 | 6/1998 | Magee et al. | 395/680 |

OTHER PUBLICATIONS

Werner Feibel; The Encyclopedia of Networking, 2nd Ed.; pp. 20–22, 1996.

*Primary Examiner*—Zarni Maung
*Attorney, Agent, or Firm*—Raymond M. Galasso

[57] ABSTRACT

A preferred embodiment of the present invention includes a method and apparatus for sending messages between memory spaces included in a computer network. More specifically, for a preferred embodiment, each memory space included in a computer network is identified by a site id that is composed of a manufacturer id and a machine id. When messages are sent between memory spaces, the site id of the sending memory space is compared to the site id of the receiving memory space. If the site ids match, the message is sent using an intra-memory copy. Otherwise a networking protocol is invoked. Importantly, the comparison between site ids occurs relatively early in the sending of the message. As a result, efficiency is increased in cases where a message is being sent within the same memory space.

14 Claims, 3 Drawing Sheets

METHOD AND APPARATUS FOR OBJECT REFERENCE PROCESSING

RELATED APPLICATIONS

Concurrently filed, co-pending U.S. application Ser. No. 08/887,758 entitled "Method And Apparatus For Providing Kernel-Mode Support For Fast Interprocess Communication" Of Peter Bonham, Ulrich Klein, And Harri Mauria is related to the subject matter of this application and is incorporated in this application by reference.

FIELD OF THE INVENTION

The present invention relates generally to distributed computing systems. More specifically, the present invention is a method and apparatus for network-independent referencing of objects located in remote or local memories.

BACKGROUND OF THE INVENTION

In recent years, the networking of computers has become increasingly common. For example, Automated Teller Machines, or ATMs, represent one type of commonly used computer network. Computer networks are also used to schedule air travel reservations and to link computers within offices and factories. Recently, with the rise of the World Wide Web, computer networking has gained an acceptance and notoriety which would have been difficult to imagine, even in the recent past.

As computer networks grow in size and complexity there has been increased used of a networking model known as "distributed object computing." Distributed object computing is a methodology that allows the resources and services within a computer network to be manipulated as objects. Software processes access resources and services by performing object calls using the objects associated with the resources and services. Effectively, distributed object computing extends the realm of object oriented programming to the resources and services included within computer networks.

Part of the appeal of distributed object computing is that a software process is able to manipulate objects without regard to the location of the objects. Thus, a process may manipulate objects that exist on the process'local system as well as objects that exist on remote computer systems. In traditional networking systems, however, the ability to manipulate both local and remote objects is obtained at some loss in efficiency. More specifically, in most traditional networking systems, the fact that data is being sent by a system to itself is not detected until after a substantial amount of processing has been performed. As a result, when a process manipulates a local object, the networking protocol will still perform a substantial amount of work before detecting that the object is actually local. Thus, a need exists for networking systems that can detect at an early time the fact that data is local, i.e., that data is being sent by a computer to itself. This need is present in computer networks in general and particularly relevant to distributed object computing systems.

Another area in which current distributed object systems are inadequate relates to the way in which objects on remote systems are addressed by processes on local systems. It is generally the case that an object located on a remote system will be addressed using network-dependent information such as the IP address of the system where the object is located. This approach fails, however, when the network technology or topology is changed and the object is no longer located at the same point in the network. Currently, changes in network technology and topology are accommodated by changing all references to objects to include the object's new address. Where large numbers of objects are involved, however, this may be impractical. Thus, a need exists for networking systems that provide a network-independent addressing scheme for data and objects. This need is particularly relevant to distributed object computing systems.

SUMMARY OF THE INVENTION

A preferred environment for the present invention includes a computer network having one or more host computer systems. Computer memories included in the network are known as "memory spaces." Importantly, there may or may not be a one-to-one correspondence between memory spaces and host computer systems. For example, in the case of shared memory systems, a single memory space may be associated with two or more host computer systems.

Each memory space included in the computer network is identified by a site identifier, or site id. A site id includes at least two words, the first being a manufacturer id and the second being a machine id. The manufacturer id is set by a global authority on a per-manufacturer basis. The machine id is assigned by the manufacturer of the host computer system, or systems, that are associated with the memory space to which the machine id is assigned.

Application programs within the computer network preferably communicate using a request/response IPC (interprocess communication) model. In the preferred IPC model, client programs send requests to server programs and receive responses from the server programs. The client and server programs may be located on the same, or on remote, host computer systems.

Requests and responses are sent using client ports and server ports. To send a request, a client program adds an attribute to the sending client port. The attribute includes the site id of the memory space of the receiving server port. To send a response, a server program adds an attribute to the sending server port. The attribute includes the site id of the memory space of the receiving client port. Thus, before a message is sent, the sending port includes an attribute that includes the site id of the memory space of the receiving port.

Before sending a request or response, the sending host computer system determines if a local transfer or remote transfer is required (i.e., whether the message will be sent within a single memory space or between memory spaces). To make this determination, the sending host computer retrieves the site id included as an attribute of the sending port. This is the site id of the memory space to which the message will be sent. The host computer then retrieves the site id of the memory space that includes the sending port. This is the site id of the memory space from which the message will be sent. If these two site ids match, the message transfer is local (i.e., within a single memory space). Otherwise, the message transfer is remote (i.e., between memory spaces). Local transfers are performed using the memory space associated with the two site identifiers. In this way, the expense of copying data using a networking protocol is avoided. Importantly, the comparison between the site ids occurs relatively early in the process of sending the request or response. As a result, transfers between the same memory space are highly efficient.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

Figure 1:
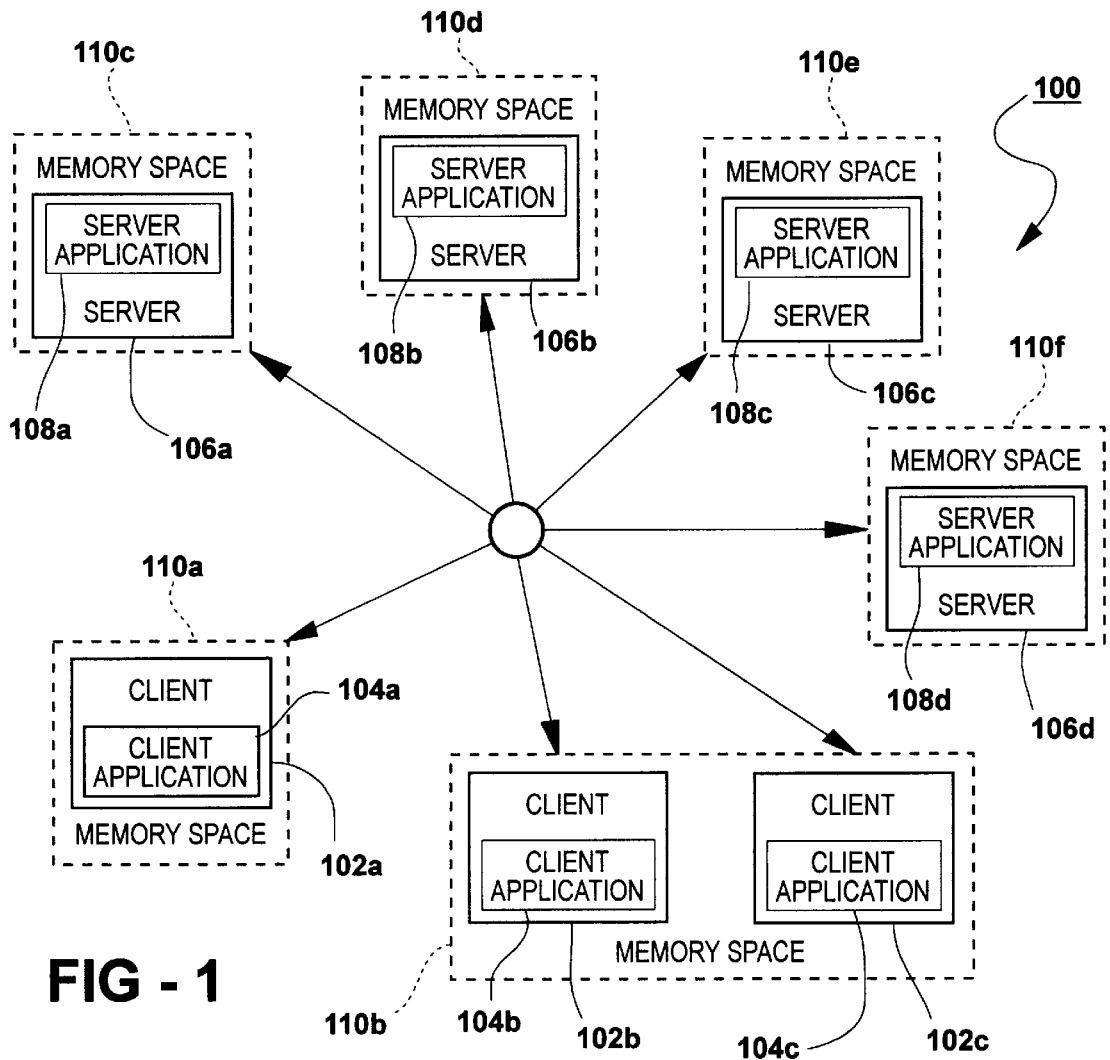
FIG. 1 is a block diagram of a computer network shown as a representative environment for the present invention.

In FIG. 1, a computer network 100 is shown as a representative environment for the present invention. Structurally, network 100 includes a number of client computer systems 102. Client systems 102 are intended to represent a wide range of computer systems including personal computers, servers and workstations. Each client system includes a respective client application 104. Network 100 also includes one or more server systems 106 each including a server application 108. Like client systems 102, server systems 106 may be selected from a wide range of computer system types. Each system 102, 106 is associated with a memory space 110. Each memory space 110 is a computer memory. Because computer systems may share a single memory, there may not be a strict one-to-one correspondence between memory spaces 110 and systems 102, 106. For example, client system 102b and client system 102c share a single memory space 110b. In other cases, a single system 102, 106 may include more than one memory space 110.

Figure 2:
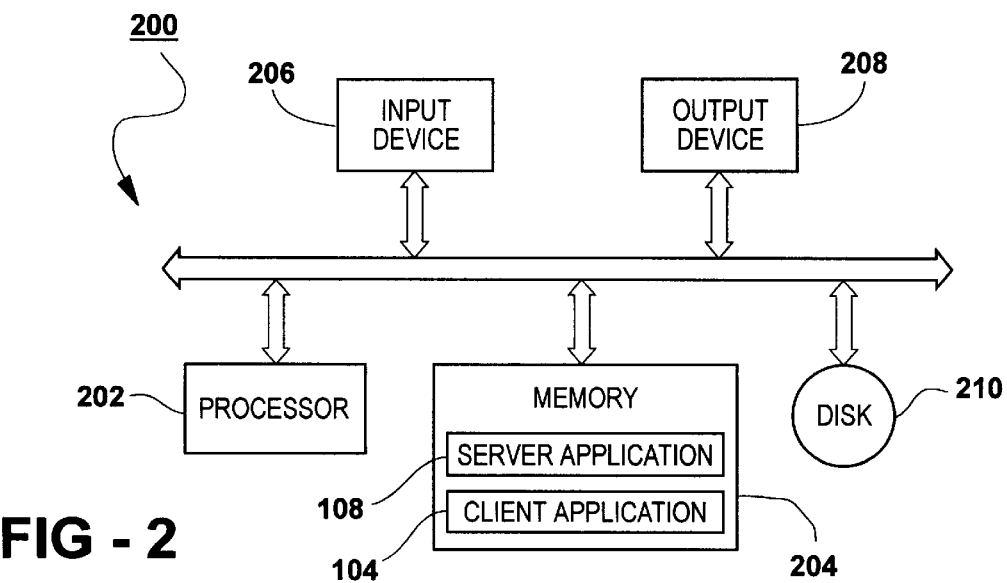
FIG. 2 is a block diagram of a host computer system in accordance with a preferred embodiment of the present invention.

In FIG. 2, a computer system 200 is shown as a representative implementation for client systems 102 and server systems 106 of network 100. Structurally, computer system 200 includes a processor, or processors 202, and a memory 204. An input device 206 and an output device 208 are connected to processor 202 and memory 204. Input device 206 and output device 208 represent a wide range of varying I/O devices such as disk drives, keyboards, modems, network adapters, printers and displays. Computer system 200 also includes a disk drive 210 of any suitable disk drive type.

Typically, memory 204 includes one or more executing programs. In the case of server systems 106 these executing programs include server applications 108. For client systems 102, memory 204 includes client applications 104.

Figure 3:
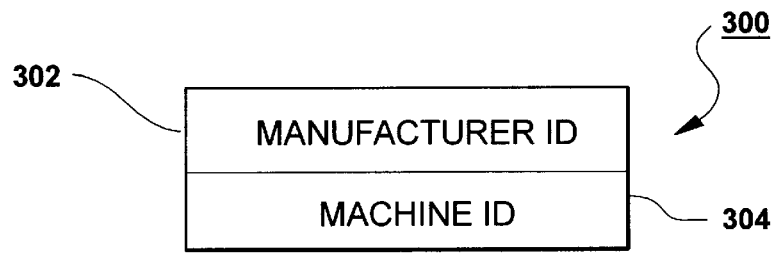
FIG. 3 is a block diagram of a site id in accordance with a preferred embodiment of the present invention.

Within network 100, each memory space 110 has an associated site id of the type shown in FIG. 3 and generally designated 300. Site id 300 includes a manufacturer id 302 and a machine id 304. Preferably, both manufacturer id 302 and machine id 304 are thirty-two bit integer values. Manufacturer id 302 is assigned by a global authority on a per-manufacturer basis. Typically, this means that each manufacturer of computer systems 102, 106 will have a distinct manufacturer id 302. Machine id 304 is assigned on a per-memory space 110 basis by the manufacturer of the memory space 110. For the purposes of the present invention, manufacturers are free to assign manufacturer ids 302 in any order. Importantly, however, each manufacturer id 304 must be associated with a different memory space 110.

Each resource within network 100 is associated with a Universally Unique Resource ID (UURID). The UURID of a resource contains a copy of the site id 300 that identifies the memory space 110 that includes the resource. Application programs do not manipulate UURIDs directly. Instead, application programs within network 100 refer to resources using data structures known as Native Object References (NORs). A NOR that refers to a resource includes the UURID of the resource. Importantly, a NOR that refers to a resource may be resolved to yield the UURID included in the NOR. In turn, the UURID may be used to obtain the site id 300 that identifies the memory space 110 that includes the resource.

Figure 4:
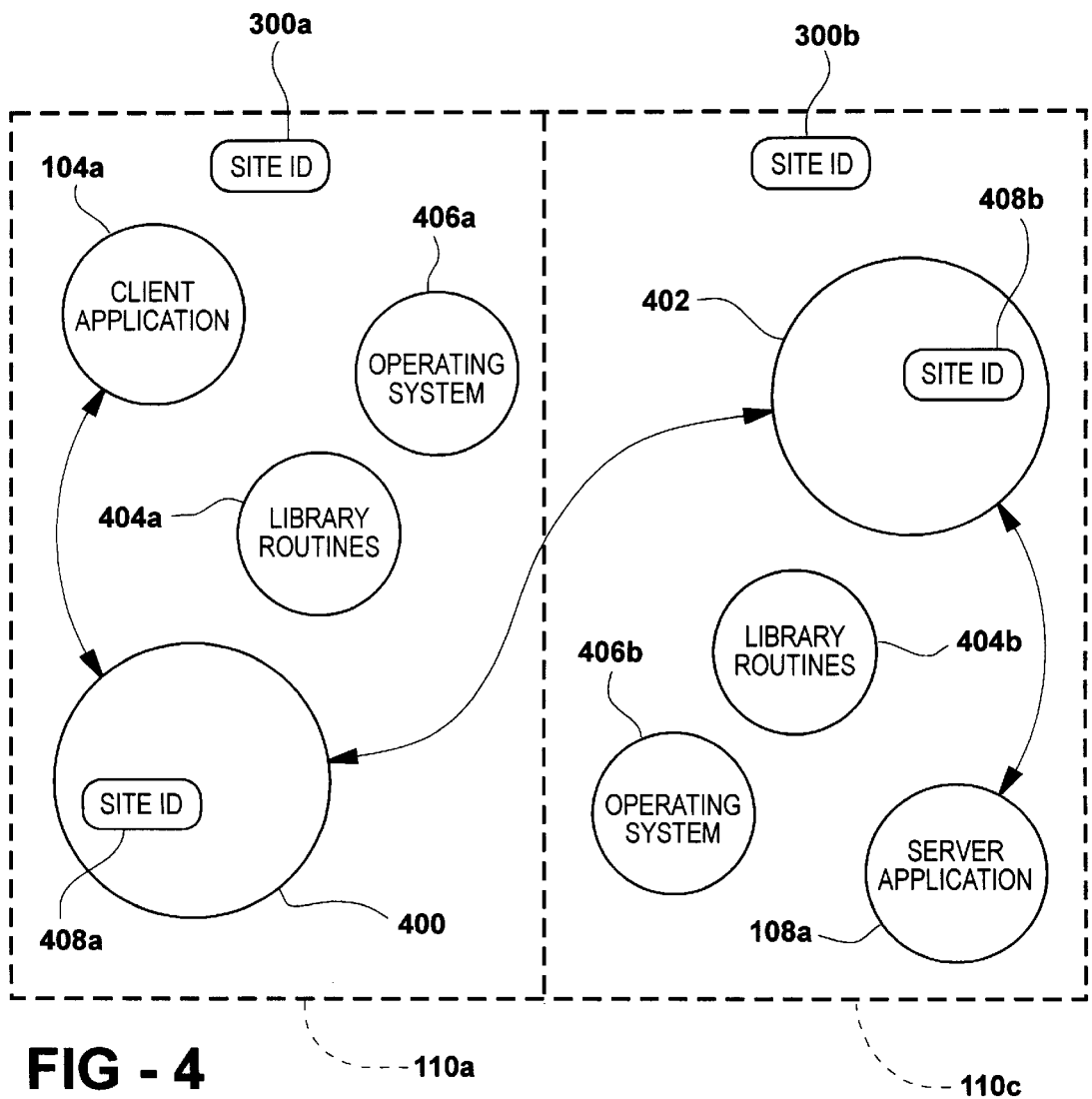
FIG. 4 is a block diagram of a client port and server port in accordance with a preferred embodiment of the present invention.

Application programs within network 100 communicate using a request/response Inter-process Communication (IPC) model. The IPC model is preferably provided through the use of a software model known as "ports." To illustrate this model, FIG. 4 shows an exemplary scenario where a client application 104a communicates with a server application 108a. Within the exemplary scenario of FIG. 4, client application 104a is included in memory space 110a. Server application 108a is included in memory space 110c. Memory spaces 110a and 110c are identified by site ids 300a and 300b, respectively.

A client port 400 is included in memory space 110a. Similarly, a server port 402 is included in memory space 110c. Client port 400 is a resource created by client application 104 using library routine package 404a and operating system 406a. Server port 402 is, similarly, a resource created by server application 108 using library routine package 404a and operating system 406a. Functionally, client application 104a sends requests messages using client port 400. The request messages are forwarded to server port 402 and received by server application 108a. Server application 108a sends response messages using server port 402. These response messages are routed to client port 400 and received by client application 104a.

Prior to sending a request, client application 104a adds an attribute 408a to client port 400. Attribute 408a is a data structure that either includes, or may be resolved to produce, the site id 300b of the memory space 110c that includes receiving server port 402. In general, it may be appreciated that attribute 408a may be selected from a wide range of data structure types. Preferably, however, attribute 408a is a NOR. NORs are data structures that are used by processes to refer to resources, such as client port 400 and server port 402.

In a similar fashion, server port 402 must be configured to include an attribute 408b before server port 402 is used to send a response. Attribute 408b is a data structure that that either includes, or may be resolved to produce, the site id 300a of the memory space 110a that includes receiving client port 400. Like attribute 408a, attribute 408b may be selected from a wide range of data structure types. Preferably, however, attribute 408b is a NOR. Based on the foregoing, it may be appreciated that before a message is sent, the sending port (400 or 402) is configured to include an attribute (408a or 408b) that includes, or may be resolved to produce, the site id (300a or 300b) of the memory space (110a or 110c) of the receiving port (400 or 402).

Figure 5:
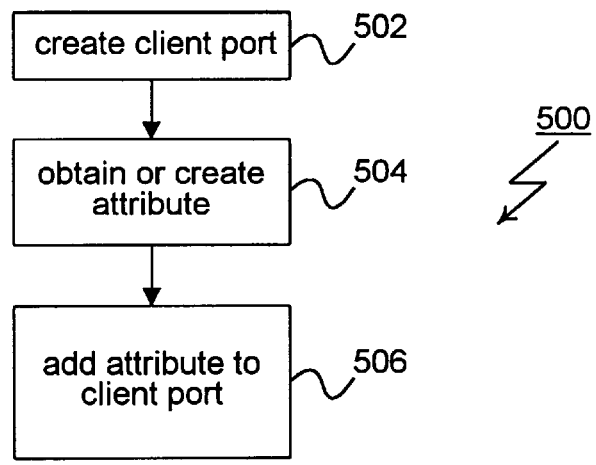
FIG. 5 is a flow chart showing the steps associated with initialization of a client port as used with a preferred embodiment of the present invention.

A method for initializing client port 400 for sending a request from client application 104a to server application 108a is shown in FIG. 5 and generally designated 500. Method 500 begins with step 500 where client application 104a calls a routine included in library routines 404a to create client port 400. The code included in library routines 404a then creates the client port 400 on behalf of client application 104a. During creation of the client port 400, a resource handle is created and associated with client port 400.

In step 504, client application 104a creates or obtains an attribute 408b that either includes, or may be resolved to produce, the site id 300b of the memory space 110c that includes receiving server port 402. Preferably, attribute 408a is a NOR.

In step 506, client application 104a calls a second routine included in library routines 404a to add attribute 408a to client port 400. Typically, this call is performed by passing the resource handle created in step 502 and the NOR created in step 504 to the second routine. The second routine then adds the NOR as attribute 408a of client port 400.

Figure 6:
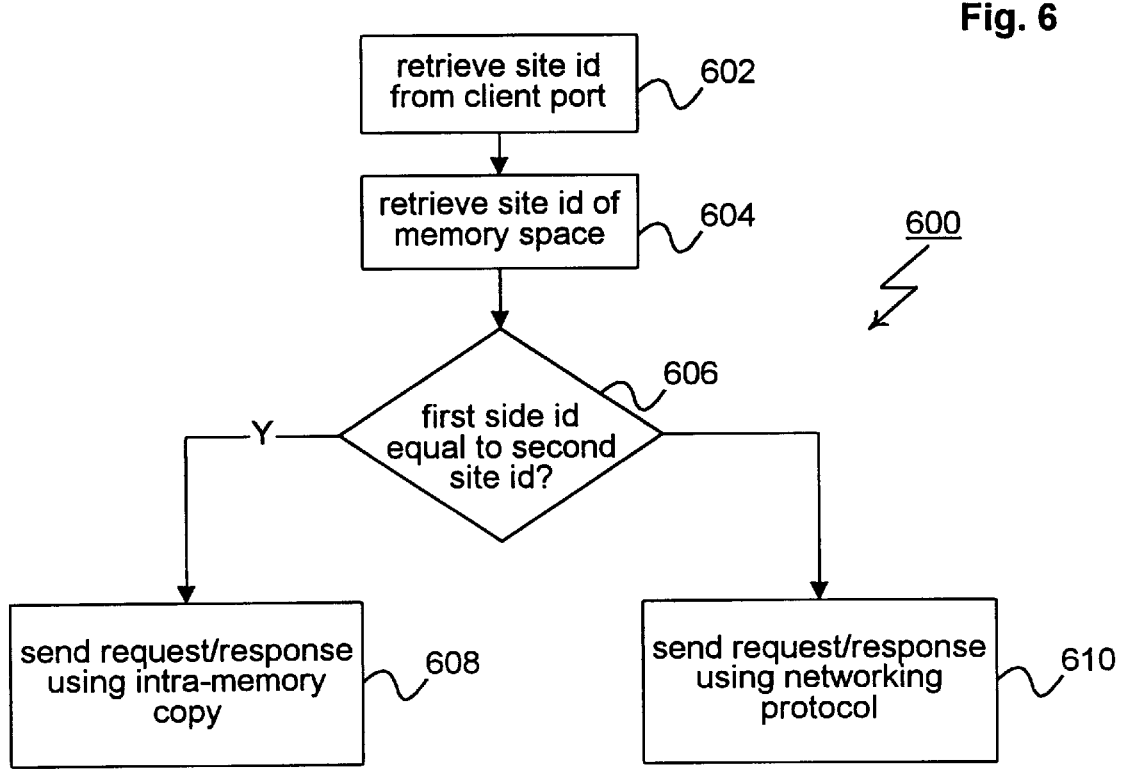
FIG. 6 is a flow chart showing the steps associated with transfer of a message between a client port and a server port as used with a preferred embodiment of the present invention.

To send a request from client application 104 to server application 108, client application calls a third routine included in library routines 404a. A method for sending the request is shown in FIG. 6 and generally designated 600. Method 600 begins with step 602 where the third routine retrieves the site id 300b included in the attribute 408a of client port 400. Subsequently, in step 604 the third routine retrieves the site id 300a that identifies memory space 110a. Thus, at the conclusion of steps 602 and 604, the third routine has obtained the site id 300b that identifies the memory space 110c of the receiving server port 402. Additionally, the third routine has obtained the site id 300a that identifies the memory space 110a of the sending client port 400.

In step 606, these two site ids (300a and 300b) are compared. If there is a match, execution of method 600 continues at step 608. In step 608, the third routine causes the message to be transferred to the server application 108 using local processing and an intra-memory copy within memory space 110a. Typically, because this copy is being performed between two distinct processes (i.e., the client application 104 and the server application 108) it may be necessary to perform step 604 using a system call or equivalent method. In other cases, however, a shared memory segment or other strategy may be employed that avoids the expense generally associated with system calls.

The alternative to step 608 is step 610. Step 610 is reached, therefore, when step 606 determines that the site ids 300a and 300b do not match. In this case, the client port 400 and server port 402 reside in separate memory spaces 110a and 110 b (this is the case illustrated in FIG. 4). As a result, it is necessary to send the request using an input/output operation to physically copy data between client system 102a and server system 106a. In step 606, the third routine performs the steps required to initiate the required inter-memory copy.

Importantly, steps 602 through 606 occur relatively early in the processing of method 600. In fact, steps 602 through 606 are performed before attempting to send the request using a networking protocol, such as TCP/IP. As a result, the overhead associated with sending the request using a networking protocol, i.e., having the request sequentially traverse many or all of the layers in the appropriate protocol stack, may be avoided. Additionally, it may be possible to include steps 602 through 606 as part of the user-mode processing of the third routine. In this case, it may be possible to avoid the expense of any supervisor calls that are associated with the use of networking protocols like TCP/IP.

In some cases, it will be advantageous to use site id 300 as part of a more generalized strategy within network 100. For one such strategy each object or resource within network 100 is modified to include the site id 300 of the memory space 110 that includes the object or resource. References to objects or resources are performed using the site id 300 of the object or resource. Importantly, the site id 300 of an object or resource in a network of this type is relatively independent of the underlying topology or technology of the network. As a result, if the topology or topography of the network changes, each site id 300 remains valid.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of sending a message from a first memory space to a second memory space, the first memory space on a first computer, the first memory space having a first network layer independent identifier, the method comprising:

obtaining a second network layer independent identifier for the second memory space using the first computer;

associating the second network layer independent identifier to a first port on the first computer;

receiving a request to send the message at the first port;

determining whether the second network layer independent identifier matches the first network layer independent identifier; and if the first network layer independent identifier and the second network layer independent identifier are different:

identifying a second port on a second computer having the second memory space using the second network layer independent identifier and sending the message to the second port; otherwise sending the message by performing an intra-memory copy on the first computer between the first memory space and the second memory space.

2. A method of claim 1, wherein determining whether the second network layer independent identifier matches the first network layer independent identifier occurs as part of user-mode execution of the first computer.

3. A method of claim 1, further comprising associating the first network layer independent identifier to the second port.

4. A method of claim 1, further comprising:

changing a network layer identifier for the second computer;

using the second network layer independent identifier to obtain the network layer identifier for the second computer.

5. A method of claim 1, wherein the first network layer independent identifier comprises a manufacturer identifier and a memory space identifier.

6. A method of claim 1, wherein the second network layer independent identifier comprises a unique sixty-four bit integer value.

7. A method of claim 1, further comprising:

changing a network layer identifier associated with the second memory space and using the second network layer independent identifier to locate the second memory space after changing the network layer identifier.

8. A method of claim 1, wherein the second network layer independent identifier is associated with a plurality of computers, each of the plurality of computers including the second memory space.

9. An apparatus for sending a message from a first memory space to a second memory space, the first memory space on a first computer, the first memory space having a first network layer independent identifier, the apparatus comprising:

means for obtaining a second network layer independent identifier for the second memory space using the first computer;

means for associating the second network layer independent identifier to a first port on the first computer;

means for receiving a request to send the message at the first port;

means for determining whether the second network layer independent identifier matches the first network layer independent identifier; and means for sending the message responsive to the means for determining.

10. The apparatus for claim 9, wherein the means for sending the message comprise:

means for identifying a second port on a second computer having the second memory space using the second network layer independent identifier and means for sending the message to the second port.

11. The apparatus for claim 9, wherein the means for sending the message comprise means for sending the message by performing an intra-memory copy on the first computer between the first memory space and the second memory space.

12. A computer data signal embodied in a carrier wave comprising:

a computer program for sending a message from a first memory space to a second memory space, the first memory space on a first computer, the first memory space having a first network layer independent identifier, the computer program comprising a first set of instructions for obtaining a second network layer independent identifier for the second memory space using the first computer;

a second set of instructions for associating the second network layer independent identifier to a first port on the first computer;

a third set of instructions for receiving a request to send the message at the first port;

a fourth set of instructions for determining whether the second network layer independent identifier matches the first network layer independent identifier; and a fifth set of instructions for sending the message responsive to the fourth set of instructions.

13. The computer program of claim 12, wherein the fifth set of instructions comprises:

a sixth set of instructions for identifying a second port on a second computer having the second memory space using the second network layer independent identifier; and a seventh set of instructions for sending the message to the second port.

14. The computer program of claim 12, wherein the fifth set of instructions comprises:

a sixth set of instructions for sending the message by performing an intra-memory copy on the first computer between the first memory space and the second memory space.

* * * * *